US00RE43248E

(19) United States
(12) Reissued Patent
Nevill

(10) Patent Number: US RE43,248 E
(45) Date of Reissued Patent: Mar. 13, 2012

(54) INTEROPERABILITY WITH MULTIPLE INSTRUCTION SETS

(75) Inventor: Edward Colles Nevill, Huntingdon (GB)

(73) Assignee: ARM Limited, Cambridge (GB)

(21) Appl. No.: 10/066,475

(22) Filed: Feb. 1, 2002

Related U.S. Patent Documents

Reissue of:
(64) Patent No.: 6,021,265
Issued: Feb. 1, 2000
Appl. No.: 08/840,557
Filed: Apr. 14, 1997

U.S. Applications:
(62) Division of application No. 08/477,781, filed on Jun. 7, 1995, now Pat. No. 5,758,115.

(30) Foreign Application Priority Data

Jun. 10, 1994 (GB) ..... 9411670

(51) Int. Cl.
*G06F 9/30* (2006.01)
(52) U.S. Cl. ..... 712/209; 712/210
(58) Field of Classification Search ..... 712/209, 712/210
See application file for complete search history.

(56) References Cited

U.S. PATENT DOCUMENTS 4,217,638 A 8/1980 Namimoto et al.
4,236,204 A 11/1980 Groves
4,274,138 A 6/1981 Shimokawa
4,338,663 A 7/1982 Strecker et al. ..... 712/228
4,346,437 A 8/1982 Blahut et al.
4,398,243 A 8/1983 Holberger et al.
4,434,459 A 2/1984 Holland et al.
4,434,461 A 2/1984 Puhl
4,459,657 A 7/1984 Murao
4,511,966 A 4/1985 Hamada ..... 364/200
4,514,803 A 4/1985 Agnew et al. ..... 364/200
4,554,627 A 11/1985 Holland et al.
(Continued)

FOREIGN PATENT DOCUMENTS

EP 109567 10/1983
(Continued)

OTHER PUBLICATIONS

Order Construing Disputed Claims and Terms, *ARM Limited* v. *picoTurbo, Inc.,* Case No. C-00-00957 (N.D. Calif., Jun. 15, 2001)(Wilken, J.).

(Continued)

*Primary Examiner* — Kenneth R Coulter
(74) *Attorney, Agent, or Firm* — White & Case LLP

(57) ABSTRACT

Data processing apparatus comprising: a processor core having means for executing successive program instruction words of a predetermined plurality of instruction sets; a data memory for storing program instruction words to be executed; a program counter register for indicating the address of a next program instruction word in the data memory; means for modifying the contents of the program counter register in response to a current program instruction word; and control means, responsive to one or more predetermined indicator bits of the program counter register, for controlling the processor core to execute program instruction words of a current instruction set selected from the predetermined plurality of instruction sets and specified by the state of the one or more indicator bits of the program counter register.

69 Claims, 3 Drawing Sheets

U.S. PATENT DOCUMENTS

| | | | | | |
|---|---|---|---|---|---|
| 4,685,080 | A | | 8/1987 | Rhodes, Jr. et al. | |
| 4,695,943 | A | | 9/1987 | Keeley et al. | 364/200 |
| 4,839,797 | A | | 6/1989 | Katori et al. | |
| 4,849,922 | A | | 7/1989 | Riolfo | 364/725 |
| 4,870,614 | A | | 9/1989 | Quatse | 364/900 |
| 4,876,639 | A | | 10/1989 | Mensch, Jr. | |
| 4,905,196 | A | | 2/1990 | Kirrmann | 365/200 |
| 4,930,068 | A | | 5/1990 | Katayose et al. | |
| 4,931,989 | A | | 6/1990 | Rhodes, Jr. et al. | |
| 5,077,659 | A | | 12/1991 | Nagata | |
| 5,115,500 | A | * | 5/1992 | Larsen | 712/209 |
| 5,148,536 | A | | 9/1992 | Witek et al. | 395/425 |
| 5,187,791 | A | | 2/1993 | Baum | |
| 5,193,158 | A | | 3/1993 | Kinney et al. | |
| 5,276,824 | A | | 1/1994 | Skruhak et al. | |
| 5,303,378 | A | | 4/1994 | Cohen | |
| 5,327,566 | A | | 7/1994 | Forsyth | 710/260 |
| 5,335,331 | A | | 8/1994 | Murao et al. | |
| 5,353,420 | A | | 10/1994 | Zaidi | |
| 5,363,322 | A | | 11/1994 | Gergen et al. | |
| 5,386,563 | A | | 1/1995 | Thomas | |
| 5,392,408 | A | | 2/1995 | Fitch | 711/202 |
| 5,404,472 | A | | 4/1995 | Kurosawa et al. | |
| 5,416,739 | A | | 5/1995 | Wong | 365/189.01 |
| 5,420,992 | A | | 5/1995 | Killian et al. | |
| 5,475,824 | A | | 12/1995 | Grochowski et al. | 712/206 |
| 5,481,684 | A | | 1/1996 | Richter et al. | 712/212 |
| 5,481,693 | A | | 1/1996 | Blomgren et al. | 712/225 |
| 5,524,211 | A | | 6/1996 | Woods et al. | 709/220 |
| 5,542,059 | A | | 7/1996 | Blomgren | |
| 5,561,810 | A | | 10/1996 | Ohtomo | |
| 5,568,646 | A | | 10/1996 | Jagger | |
| 5,574,928 | A | | 11/1996 | White et al. | |
| 5,583,804 | A | | 12/1996 | Seal et al. | |
| 5,598,546 | A | | 1/1997 | Blomgren | |
| 5,600,845 | A | | 2/1997 | Gilson | 395/800 |
| 5,606,714 | A | | 2/1997 | Intrater et al. | 395/800 |
| 5,630,083 | A | | 5/1997 | Carbine et al. | |
| 5,630,153 | A | | 5/1997 | Intrater et al. | 395/800 |
| 5,638,525 | A | | 6/1997 | Hammond et al. | |
| 5,642,516 | A | | 6/1997 | Hedayat et al. | |
| 5,664,147 | A | | 9/1997 | Mayfield | 711/137 |
| 5,666,355 | A | | 9/1997 | Huah et al. | 370/311 |
| 5,671,422 | A | | 9/1997 | Datta | |
| 5,689,672 | A | | 11/1997 | Witt et al. | |
| 5,692,152 | A | | 11/1997 | Cohen et al. | 395/467 |
| 5,701,493 | A | | 12/1997 | Jaggar | |
| 5,740,461 | A | | 4/1998 | Jaggar | |
| 5,758,115 | A | | 5/1998 | Nevill | |
| 5,781,750 | A | * | 7/1998 | Blomgren et al. | 712/209 |
| 5,784,585 | A | | 7/1998 | Denman | |
| 5,784,636 | A | | 7/1998 | Rupp | 395/800.37 |
| 5,796,973 | A | | 8/1998 | Witt et al. | |
| 5,968,161 | A | | 10/1999 | Southgate | 712/37 |
| 5,970,254 | A | | 10/1999 | Cooke et al. | 395/800.37 |
| 6,496,922 | B1 | * | 12/2002 | Borrill | 712/209 |

FOREIGN PATENT DOCUMENTS

| | | | |
|---|---|---|---|
| EP | 0109567 | | 10/1983 |
| EP | 169565 | | 7/1985 |
| EP | 0169565 | A | 7/1985 |
| EP | 0199173 | | 10/1986 |
| EP | 199173 | | 10/1986 |
| EP | 306920 | | 3/1989 |
| EP | 0306920 | A2 | 3/1989 |
| EP | 324308 | | 7/1989 |
| EP | 0324308 | A2 | 7/1989 |
| EP | 758464 | | 4/1998 |
| GB | 2016755 | | 9/1979 |
| GB | 20167550 | A | 9/1979 |
| GB | 2284492 | | 6/1995 |
| JP | 52-40826 | | 10/1977 |
| JP | 58-3040 | | 6/1981 |
| JP | 58-155457 | | 9/1983 |
| JP | 62-25334 | | 2/1987 |
| JP | 62-151938 | | 7/1987 |
| JP | 62-262146 | | 11/1987 |
| JP | 63111533 | | 5/1988 |
| JP | 1007129 | | 1/1989 |
| JP | A-03-150633 | | 6/1991 |
| JP | 4-76626 | | 3/1992 |
| JP | 5-265751 | | 10/1993 |
| JP | 6-83615 | | 3/1994 |
| JP | 6083615 | | 3/1994 |
| JP | 7-281890 | | 10/1995 |
| JP | 52-68340 | | 7/1997 |
| WO | 9724660 | | 7/1997 |

OTHER PUBLICATIONS

Defendant picoTurbo's Civil L.R. 16-9(b)(1)-(4) Response Chart Concerning U.S. Patent No. 6,021,265, *ARM Limited* v. *picoTurbo, Inc.,* Case No. C-00-00957 (N.D. Calif., Dec. 22, 2000).

Initial Disclosure by Defendant picoTurbo, Inc. of Prior Art Under Local Rule 16-7, Case C00-00957CW, Aug. 14, 2000.

Defendant picoTurbo's Civil L.R. 16-9(b)(1)-(4) Supplemental Responses U.S. Patent Nos. 5,740,461, 5,568,646, 5,758,115, 6,021,265, and 5,583,804, May 17, 2001.

Second Supplement to Defendant picoTurbo's Civil L.R. 16-9(b)(1) Response Charts, Jun. 6, 2001.

picoTurbo's Third Supplemental Response Charts, Aug. 31, 2001.

Joint Designation of Disputed Terms for Claim Construction, Feb. 5, 2001.

Plaintiff ARM's Opening Brief on Claim Construction, Mar. 1, 2001.

Defendant picoTurbo's Response Brief on Claim Construction, Mar. 15, 2001.

Plaintiff ARM's Reply Brief on Claim Construction, Mar. 22, 2001.

Expert Report: Professor Alan Jay Smith, Aug. 31, 2001.

Rebuttal Expert Report of Dr. Earl E. Swartzlander, Jr., Sep. 20, 2001.

Plaintiff ARM's Response to picoTurbo, Inc.'s First Set of Interrogatories to ARM, Limited, Aug. 14, 2000 (Interrogatories 1 and 2 only).

Defendant picoTurbo, Inc.'s Response to Plaintiff ARM's Second Set of Interrogatories, Aug. 18, 2000.

Defendant picoTurbo's Motion for Summary Judgment on Issues of Patent Invalidity, Oct. 23, 2001.

Memorandum of Points and Authorities in Support of Plaintiff ARM's Opposition and Cross Motion for Summary Judgment that the Patents-in-Suit are not Invalid, Nov. 2, 2001.

Plaintiff ARM's Reply in Support of its Opposition and Cross Motion for Summary Judgment that the Patents-in-Suit are not Invalid.

picoTurbo's Reply in Support of Motion for Summary Judgment on Invalidity and Opposition to ARM's Cross-Motion, Nov. 9, 2001.

Declaration of Professor Alan Jay Smith, Oct. 17, 2001.

Supplemental Declaration of Professor Alan Jay Smith, Nov. 8, 2001.

Declaration of Dr. Earl E. Swartzlander, Jr., Nov. 1, 2001.

"Instruction-Processing Optimization Techniques for VSLI Microprocessors", by John David Bunda, Ph.D. Dissertation, University of Texas at Austin, May 1993.

Clark et al., IEEE Transactions on Computers, vol. 30, (10) 1981, "Memory System of a High-Performance Personal Computer", 715-722.

IBM Technical Disclosure Bulletin by P.F. Smith, entitled: "Extended Control for Microprocessors" vol. 17 No. 11 published Apr. 1975, pp. 3438-3441.

IBM Technical Disclosure Bulletin entitled: "Oncode Remap and Compression in Hard-Wired Risc Microprocessor" vol. 32 No. 10A published Mar. 1990, p. 349.

IBM Technical Disclosure Bulletin by J.C. Kemp, entitled: "Instruction Translator" vol. 15, No. 3 published Aug. 1972, p. 920.

* cited by examiner

INTEROPERABILITY WITH MULTIPLE INSTRUCTION SETS

Matter enclosed in heavy brackets [ ] appears in the original patent but forms no part of this reissue specification; matter printed in italics indicates the additions made by reissue.

RELATED APPLICATIONS

This is a divisional of application Ser. No. 08/477,781 filed on Jun. 7, 1995 now U.S. Pat. No. 5,758,115.

BACKGROUND OF THE INVENTION

1. Field of the Invention

This invention relates to the field of data processing, and in particular to data processing using multiple sets of program instruction words.

2. Description of the Prior Art

Data processing systems operate with a processor core acting under control of program instruction words which when decoded serve to generate core control signals to control the different elements in the processor to perform the necessary operations to achieve the processing specified in the program instruction word.

It is known to provide systems that execute program instruction words from two or more instruction sets, with means being provided to switch between use of the different instruction sets. The VAX11 computers of Digital Equipment Corporation have a VAX instruction mode and a compatibility mode that enables them to decode the instructions for the earlier PDP11 computers.

In order to switch between the different instruction sets, an instruction set switch may be hard-wired into the processor core necessitating a physical rewiring of the processor to switch instruction sets. Alternatively, a processor register may be used to specify the current instruction set to be used. In this case, the current instruction set can be selected by the operating software, by writing an instruction set-specifying value to that processor register. However, as described below, this technique requires additional program instruction words, which in turn require extra time during preparation of the software and extra memory space to store the program instruction words.

In order to execute a piece of code, a processor capable of using two or more instruction sets must have two pieces of information:

1) The address of the code in memory; and

2) The instruction set to use (i.e. the instruction set in which the code is written)

Typically, in the previously proposed processors, a call to a routine in a different instruction must be performed as described below.

1) The subroutine call is diverted from its original destination to an automatically generated instruction set selection sequence or veneer.

2) The veneer must then accomplish the following

Save the context of the caller

Select the correct instruction set

Call the original routine

On return from the original routine, select the original instruction set

Restore the callers context.

This process can be made relatively transparent to the programmer by use of a conventional software tool called a Linker. However, the process has a five instruction overhead per routine which is called from a different instruction set, and it also introduces a significant processing overhead.

SUMMARY OF THE INVENTION

It is an object of the invention to improve the capabilities of data processing apparatus to switch between multiple instruction sets.

This invention provides a data processing apparatus comprising:

a processor core having means for executing successive program instruction words of a predetermined plurality of instruction sets;

a data memory for storing program instruction words to be executed;

a program counter register for indicating the address of a next program instruction word in the data memory;

means for modifying the contents of the program counter register in response to a current program instruction word; and control means, responsive to one or more predetermined indicator bits of the program counter register, for controlling the processor core to execute program instruction words of a current instruction set selected from the predetermined plurality of instruction sets and specified by the state of the one or more indicator bits of the program counter register.

With the invention, a control flag or flags to select a current instruction set is provided in the program counter register. This allows the current instruction set to be changed when a new value is written into the program counter register, for example as part of the execution of a branch instruction.

The invention recognises that if the required instruction set and the next instruction address are encoded in separate processor registers as in the previously proposed processors described above (an instruction set register and a program counter register), it becomes difficult to change between instruction sets as the two separate registers have to be updated to accomplish a call to a section of code written in a different instruction set.

As an example, consider a program which is to perform a sorting or collation function. Typically this will call a generic sort routine to perform the sort. As this sort routine is generic, it must be capable of sorting in any given sequence. For example, it may be called to sort items in numerical order, alphabetical order, case insensitive alphabetical order, or any other order specified by the programmer. The means by which the programmer specifies the sorting order is to pass the address of a routine (called a compare routine) to the sort routine. This compare routine will then be called by the sort routine and will return a value to indicate whether, given two items of data, the first should be placed before or after the second in the sorted sequence.

If just the address of the compare routine is passed to the sort routine then the sort routine has no way of knowing which instruction set should be selected when the routine is to be called. If the wrong instruction set is current when an attempt is made to execute the compare routine, the results can be dramatically unsuccessful. Extra information must be passed to the sort routine to tell it what instruction set should be in force when the compare routine is called. However, many existing programs written in high level languages such as C & C++ make assumptions that all the information necessary to uniquely identify a target routine (in this case the address and the instruction set information) can be represented in a single machine word.

The invention addresses these problems by defining a predetermined bit or bits of the program counter register (PC) to indicate the instruction set to be used. In the specific example given above, the address of the compare routine passed to the sort routine can have the required instruction set encoded in the predetermined bit or bits of that address. The address, including the indicator bit or bits, is then simply moved to the program counter register when the compare routine is called.

Although certain bits of the program counter register can be reserved for use as the indicator bits, an alternative approach is to store portions of code to be executed using the various instruction sets in corresponding memory areas, so that while those memory areas are being accessed the program counter will contain a particular range of values specifying the appropriate instruction set to be used.

In order to decode instructions from the different instruction sets, it is preferred that the apparatus comprises a first instruction decoder for decoding program instruction words of the first instruction set; and a second instruction decoder for decoding program instruction words of the second instruction set; and that the control means is operable to control either the first instruction decoder or the second instruction decoder to decode a current program instruction word.

Preferably, program instruction words of the first instruction set are X-bit program instruction words; and program instruction words of the second instruction set are Y-bit program instruction words; where Y is different to X. In this way, a common processor core can be programmed with either an instruction set having longer program instruction words and allowing potentially more powerful and involved instructions, or an instruction set having shorter program instruction words, thus saving memory space where a potentially more limited instruction set can be tolerated.

In one preferred embodiment, the one or more bits of the program counter register are one or more most significant bits of the program counter register. In a program counter register of say, 32 bits, the highest order bits are seldom required since the maximum memory space that can be addressed by such a large program counter register is much more than the memory space normally used.

Alternatively, in another preferred embodiment, the one or more bits of the program counter register are one or more least significant bits of the program counter register. In this case, these bits are often not used where the minimum length of program instruction words or data words is at least two bytes.

In order to avoid invalid addresses in the data memory being accessed, it is preferred that means are provided for accessing a program instruction word stored in the data memory, the accessing means not being responsive to the one or more bits of the program counter register.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
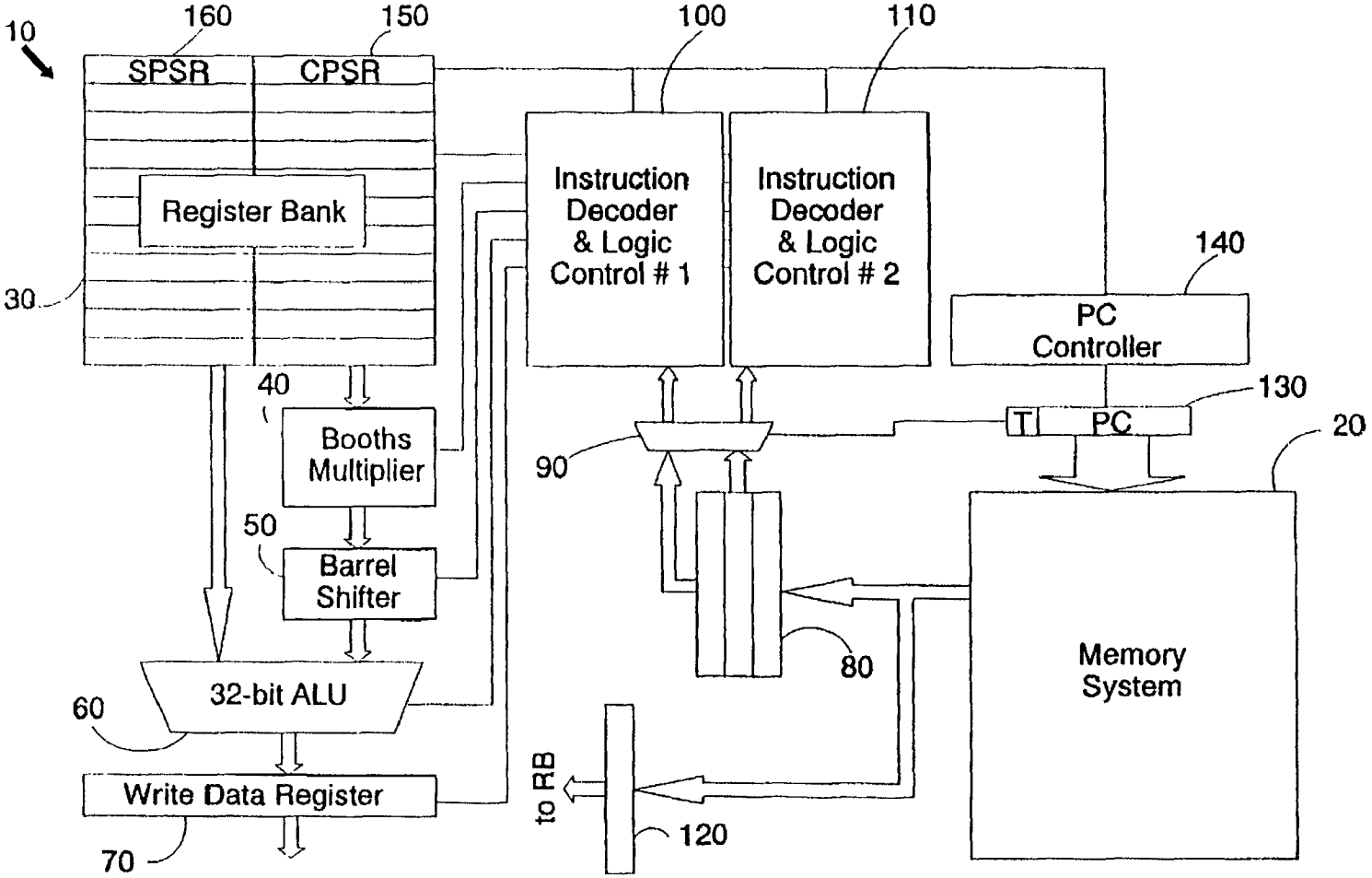
FIG. 1 is a schematic diagram of a data processing apparatus having a processor core and a memory system.

FIG. 1 is a schematic diagram of a data processing apparatus having a processor core 10 coupled to a memory system 20.

The processor core 10 includes a register bank 30, a Booths multiplier 40, a barrel shifter 50, a 32-bit arithmetic logic unit (ALU) 60 and a write data register 70. Between the processor core 10 and the memory system 20 are: an instruction pipeline 80, a multiplexer 90, a first instruction decoder 100, a second instruction decoder 110, and a read data register 120.

A program counter (PC) register 130, which is part of the processor core 10, is shown addressing the memory system 20. A program counter controller 140 serves to increment the program counter value within the program counter register 130 as each instruction is executed and a new instruction must be fetched for the instruction pipeline 80. Also, when a branch instruction is executed, the target address of the branch instruction is loaded into the program counter 130 by the program counter controller 140.

The processor core 10 incorporates 32-bit data pathways between the various functional units. In operation, instructions within the instruction pipeline 80 are decoded by either the first instruction decoder 100 or the second instruction decoder 110 (under the control of the multiplexer 90) to produce various core control signals that are passed to the different functional elements of the processor core 10. In response to these core control signals, the different portions of the processor core conduct 32-bit processing operations, such as 32-bit multiplication, 32-bit addition and 32-bit logical operations.

The register bank 30 includes a current programming status register (CPSR) 150 and a saved programming status register (SPSR) 160. The current programming status register 150 holds various condition and status flags for the processor core 10. These flags may include processing mode flags (e.g. system mode, user mode, memory abort mode, etc.) as well as flags indicating the occurrence of zero results in arithmetic operations, carries and the like. The saved programming status register 160 (which may be one of a banked plurality of such saved programming status registers) is used to store temporarily the contents of the current programming status register 150 if an exception occurs that triggers a processing mode switch.

The program counter register 130 includes an instruction set flag, T. This instruction set flag is used to control the operation of the multiplexer 90, and therefore to control whether the first instruction decoder 100 or the second instruction decoder 110 is used to decode a current data processing instruction. In the present embodiment, two instruction sets are used: a first instruction set comprises 32-bit program instruction words and is decoded by the first instruction decoder 100, and a second instruction set comprises 16-bit program instruction words and is decoded by the second instruction decoder 110. The core control signals generated by the first instruction decoder 100 and the second instruction decoder 110 are compatible with the various functional units of the core 10.

The use of two instruction sets of different program instruction word length allows a common processing core 10 to be programmed with either the first instruction set having longer words and allowing potentially more powerful and involved instructions, or the second instruction set having shorter program instruction words, thus saving memory space where a potentially more limited instruction set can be tolerated.

The provision of an instruction set flag T enables the second instruction set to be non-orthogonal to the first instruction set. This is particularly useful in circumstances where the first instruction set is an existing instruction set without any free bits that could be used to enable an orthogonal further instruction set to be detected and decoded.

The instruction set flag T is "hidden" in normally unused bits of the program counter register. This means that the T flag can be set or reset by the program counter controller 140, but the state of the T flag need have no direct effect on the operation of the memory system 20 and the instruction pipeline 80.

Figure 2:
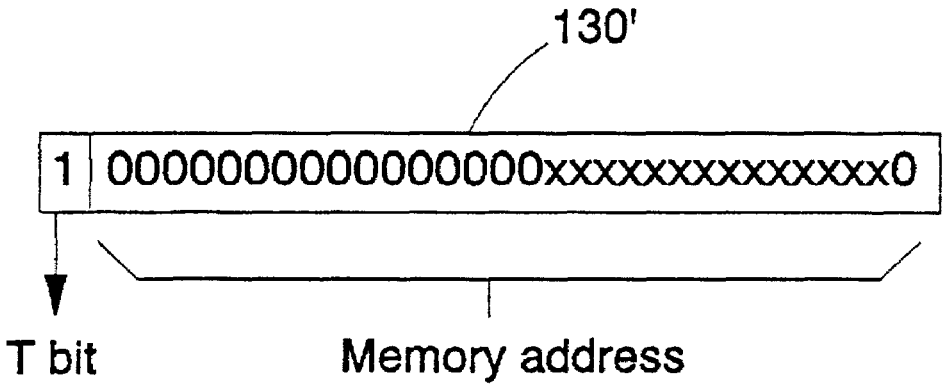
FIGS. 2 and 3 are schematic diagrams of program counter registers.
Figure 3:
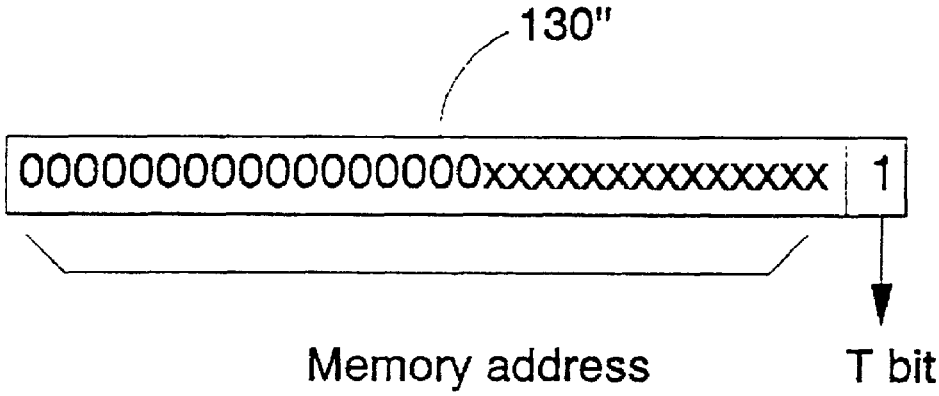

FIGS. 2 and 3 are schematic diagrams of program counter registers illustrating two possible methods in which the T bit can be encoded into the program counter register. These two methods involve encoding the T bit either as a normally unused high order (most significant) bit of the program counter register or as a normally unused low order (least significant) bit of the program counter register.

FIG. 2 is a schematic diagram of a program counter register 130' in which the T bit is encoded as the highest order bit of the program counter register.

The program counter register is a 32-bit register, which allows $2^{32}$ bytes to be addressed in the memory system 20. However, since this equates to 4 gigabytes of addressable memory space, it is extremely unlikely that the full address range made possible by the 21-bit program counter register will be required.

Accordingly, the T bit in FIG. 2 is encoded as the highest order bit of the program counter register 130'. This still allows 2 gigabytes of memory to be addressed, although in practice much less than this amount of memory will normally be addressed, and other high order bits of the program counter register may well be zeros (as shown in FIG. 2).

A problem which must be overcome is that when the T bit is set, the program counter register 130' may well point to a memory address which is far in excess of the address range of the memory system 20. In other words, the memory address pointed to by the 32-bits of the program counter register 130 is an invalid address as far as the memory system 20 is concerned.

This problem can be overcome in two straightforward ways. In one technique, the highest order bit (the T bit) of the program counter register 130' is simply not supplied as an address bit o the memory system 20. Alternatively, the address decoding within the memory system 20 may detect only a certain number of lowest order bits (e.g. the lowest order 24 bits to address a 16 megabyte address space), with the state of the remaining higher order bits being irrelevant to the decoded address. This is a standard technique in memory address decoding when it is known in advance that only a certain number of address bits will be required.

As described above, the T bit is passed from the program counter register 130' to the multiplexer 90, and determines the routing of instructions to either the first instruction decoder 100 or the second instruction decoder 110.

FIG. 3 is a schematic diagram of a second program counter register 130", in which the instruction set switching T bit is encoded as the lowest order bit of the program counter register.

The lowest order bit of the program counter register is normally unused in a processor in which the minimum instruction or data word size is at least two bytes (16 bits in this case). Accordingly, in the present embodiment the instruction program words may be either 32 bits long (4 bytes) or 16 bits long (2 bytes) so the addresses supplied from the program counter 130 to the memory system 20 will always be a multiple of two and will therefore have a zero as the least significant bit of the address.

The least significant bit of the program counter register 130" is used to store the T bit, which is supplied to the multiplexer 90 as described above. Also as described above, the lowest order bit of the program counter register 130" is not supplied to the memory system, in order that invalid addresses are not accessed by the memory system 20.

The fact that the program counter 130 is controlled by the program counter controller 140 means that the T bit can be set as part of a branch instruction carried out by the core 10. For example, if the T bit is currently set to indicate the use of the first (32-bit) instruction set and it is desired to branch to a portion of a code employing the second (16-bit) instruction set, then a branch instruction can be executed to jump to the address of the 16-bit code to be executed and simultaneously to change the T bit in the program counter register, in particular, in the arrangement shown in FIG. 2 in which the T bit is encoded as the highest order bit of the program counter register 130', a branch instruction could set the T bit to 1 by branching to (target address plus 10000000000000000000000000000000). Alternatively, in order to set the T bit to 1 in the program counter register 130" of FIG. 3, a branch instruction could take the form of branch to (target address plus 1). A similar arrangement could be used to change the T bit back to a zero.

Figure 4:
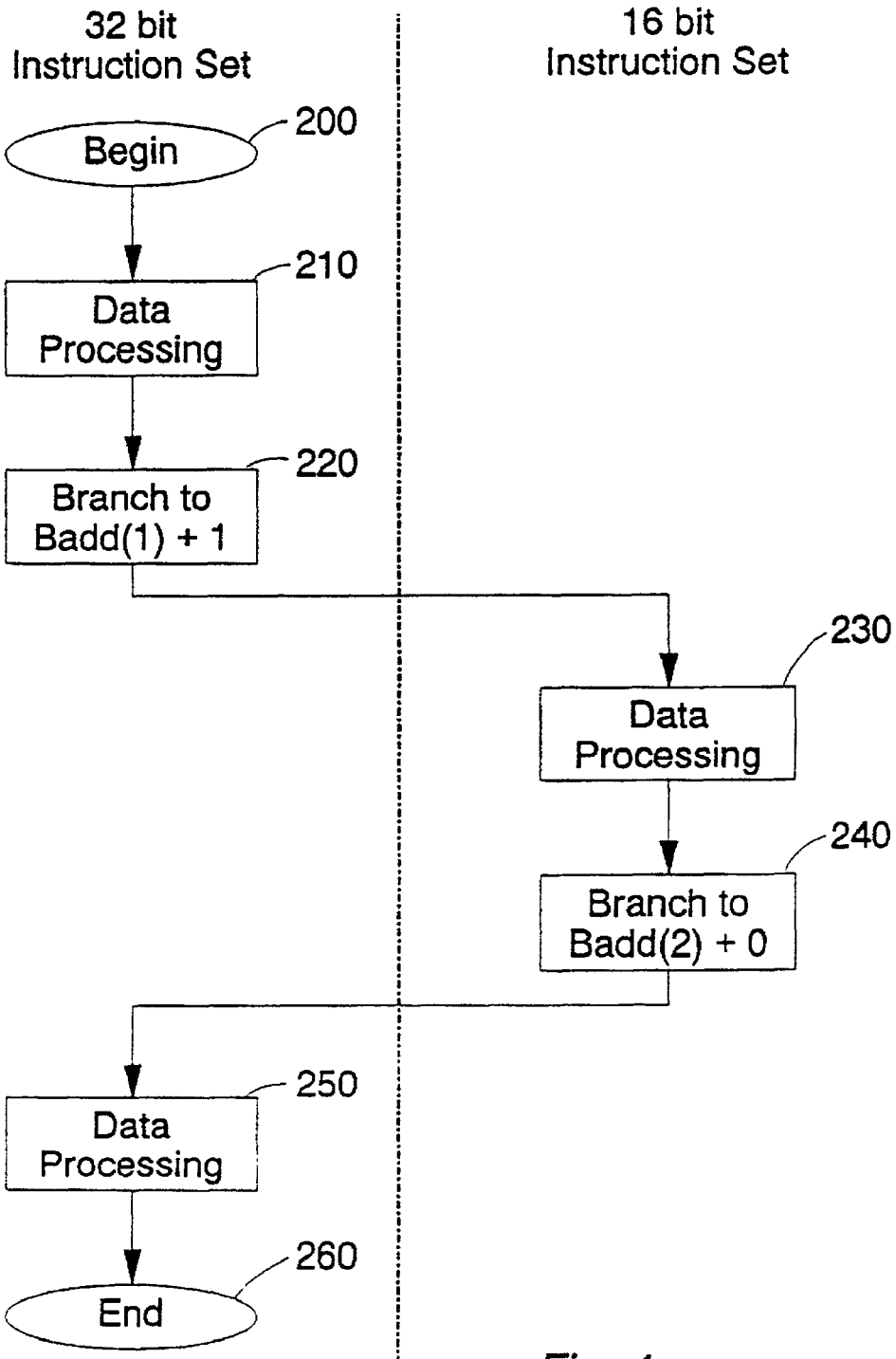
FIG. 4 is a schematic flow diagram illustrating transitions between two instruction sets using the program counter register of FIG. 3.

This process is illustrated schematically in FIG. 4, which is a flow diagram illustrating transitions between the 32-bit instruction set and the 16-bit instruction set using the program counter register 130" of FIG. 3. In FIG. 4, when the T bit is set to 1, this signifies that the 16-bit instruction set is to be used.

Referring to FIG. 4, the processing begins 200 in the 32-bit instruction set. After various data processing operations 210, a branch instruction 220 is executed to branch to an address Badd(1)+1. The address Badd(1) is the start address of a portion of code using the 16-bit instruction set, and the extra "+1" is used to switch the T bit to indicate that 16-bit code is to be used. At the target address Badd(1), various data processing operations 230 are carried out using the 16-bit instruction set. A branch instruction 240 is then performed to return to the 32-bit instruction set. In particular, the branch instruction 240 has a target address Badd(2), referring to a portion of 32-bit code, to which zero is added in order to return the T bit to a zero state. At the target address Badd(2) various data processing operations 250 are performed and the processing ends 260.

When a switch is made between the two instruction sets by changing the T bit in the program counter 130, the actual switch-over by the multiplexer 90 may be delayed to allow for existing instructions currently stored in the pipeline 80.

In summary, the switch between different processing modes (in particular, the use of different instruction sets) can be made by writing a target address and a mode flag (T) to the program counter as part of the execution of a branch instruction.

In an alternative case where the first instruction set is predefined and used in existing processors, there may be logical restrictions within the existing first instruction set preventing the normally unused bits of the program counter register 130 from being changed by the instruction set. For backwards compatibility of processors incorporating the second alternative, instruction set, it may be necessary to employ a short instruction set selection sequence of code to switch in one direction from the first (existing) instruction set to the second instruction set. Since the second instruction set would generally be added at the same time that the switching mechanism is being added, the second instruction set can be defined without the restrictions on accessing normally unused bits of the program counter register 130. This means that the branching mechanism described above can be used to switch back from the second instruction set to the first instruction set.

An example of an instruction set selection sequence (known as a "veneer") is as follows:

```
Label_Veneer
    XOR       (PC,1)
    Branch    Label
```

In this routine, the current contents of the program counter register 130" of FIG. 3 are exclusive-ORed with 1 to set the T bit to 1. (Alternatively, with the program counter 130' of FIG. 2, the current contents could be exclusive-ORed with 10000000000000000000000000000000 to set the T bit).

In an alternative veneer routine, a subtract operation could be used instead of an exclusive-OR operation to change the T-bit of the program counter register 130". This has the advantage that in some processors, the subtract operation also flushes or clears the instruction pipeline 80.

The following example assumes that the program counter 130" points 8 bytes beyond the current instruction, and that the current instruction is a 32 bit (4 byte) instruction. Accordingly, to change the least significant bit of the program counter register 130" to 1, it is necessary to add or subtract the following amounts to the current program counter register contents:

```
add 1          (to change the T bit to 1)
subtract 8     (to compensate for the program counter
               pointing ahead of the current instruction)
add 4          (to compensate for the length of the current
----------     instruction)
subtract 3     (total change)
----------
```

The instruction sequence used is therefore:

```
Label_Veneer
    SUB       (PC,PC,3)     (replace PC with PC-3)
    Branch    Label
```

In summary, the use of the program counter to store the instruction-set-specifying bit or bits has at least the following advantages:

1. It provides a single, uniform method of identifying a target routine by representing both the target address and the corresponding instruction set in a single machine word.

2. The code size is reduced as fewer veneers are required.

3. The processor performance can be improved as there is no longer a need to execute a veneer on each inter-instruction set routine call.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Data processing apparatus comprising:

(i) a processor core operable to execute successive program instruction words of a predetermined plurality of instruction sets stored in a data memory;

(ii) a program counter register for indicating an address of a next program instruction word in said data memory;

(iii) logic operable to modify the contents of said program counter register in response to a current program instruction word;

(iv) a processor core controller, responsive to one or more predetermined indicator bits of said program counter register, operable to control said processor core to execute program instruction words of a current instruction set selected from said predetermined plurality of instruction sets and specified by the state of said one or more indicator bits of said program counter register; and (v) a memory access controller operable to access program instruction words stored in said data memory, said access controller not being responsive to said one or more indicator bits of said program counter register.

2. Apparatus according to claim 1, comprising:

a first instruction decoder for decoding program instruction words of a first instruction set; and a second instruction decoder for decoding program instruction words of a second instruction set;

and in which said processor core controller is operable to control either said first instruction decoder or said second instruction decoder to decode a current program instruction word.

3. Apparatus according to claim 2, in which:

program instruction words of said first instruction set are X-bit program instruction words; and program instruction words of said second instruction set are Y-bit program instruction words;

Y being different to X.

4. Apparatus according to claim 1, in which:

program instruction words of a first instruction set are X-bit program instruction words; and program instruction words of a second instruction set are Y-bit program instruction words;

Y being different to X.

5. Apparatus according to claim 3, in which Y is 16 and X is 32.

6. Apparatus according to claim 4, in which Y is 16 and X is 32.

7. Apparatus according to claim 1, in which said one or more indicator bits of said program counter register are one or more most significant bits of said program counter register.

8. Apparatus according to claim 1, in which said one or more indicator bits of said program counter register are one or more least significant bits of said program counter register.

9. Apparatus according to claim 2, in which said one or more indicator bits of said program counter register are one or more least significant bits of said program counter register.

10. Apparatus according to claim 3, in which said one or more indicator bits of said program counter register are one or more least significant bits of said program counter register.

11. Apparatus according to claim 4, in which said one or more indicator bits of said program counter register are one or more least significant bits of said program counter register.

12. Apparatus according to claim 5, in which said one or more indicator bits of said program counter register are one or more least significant bits of said program counter register.

13. Apparatus according to claim 6, in which said one or more indicator bits of said program counter register are one or more least significant bits of said program counter register.

14. Apparatus according to claim 1, comprising a data memory for storing program instruction words to be executed.

*15. A method of switching between a predetermined plurality of instruction sets used by a data processing apparatus, the method comprising:*

*in response to a first instruction:*

*(i) accessing a sequence of bits, the sequence of bits having an address portion that identifies the location of a second instruction in a memory and an instruction set indicator portion;*

*(ii) identifying an instruction set selected from the predetermined plurality of instruction sets based on the instruction set indicator portion of the sequence of bits;*

*(iii) setting one or more control flags to indicate that a current instruction set for the data processing apparatus is the instruction set identified based on the instruction set indicator portion of the sequence of bits; and*

*retrieving the second instruction from the location specified by the address portion of the sequence of bits,*

*wherein the instruction set identified by the instruction set indicator portion of the sequence of bits is identifiable without regard to the address specified by the address portion of the sequence of bits.*

*16. The method of claim 15, further comprising executing the second instruction as an instruction of the current instruction set.*

*17. The method of claim 15 in which the predetermined plurality of instruction sets comprises a first instruction set and a second instruction set, and wherein instructions of the first instruction set are X-bit instructions and instructions of the second instruction set are Y-bit instructions, where Y is different from X.*

*18. The method of claim 17 wherein X is 32 and Y is 16.*

*19. The method of claim 15 wherein the instruction set indicator portion of the sequence of bits comprises one or more least significant bits of the sequence of bits.*

*20. The method of claim 15 wherein the instruction set indicator portion of the sequence of bits comprises one or more most significant bits of the sequence of bits.*

*21. A method of switching between a predetermined plurality of instruction sets used by a data processing apparatus, the method comprising:*

*in response to a first instruction:*

*(i) accessing a sequence of bits, the sequence of bits having an address portion that identifies the location of a second instruction in a memory and an instruction set indicator portion, the instruction set indicator portion having at least one bit that is not part of the address portion of the sequence of bits;*

*(ii) identifying an instruction set selected from the predetermined plurality of instruction sets based on the instruction set indicator portion of the sequence of bits;*

*(iii) setting one or more control flags to indicate that a current instruction set for the data processing apparatus is the instruction set identified based on the instruction set indicator portion of the sequence of bits; and*

*retrieving the second instruction from the location specified by the address portion of the sequence of bits.*

*22. The method of claim 21, further comprising executing the second instruction as an instruction of the current instruction set.*

*23. The method of claim 21 in which the predetermined plurality of instruction sets comprises a first instruction set and a second instruction set, and wherein instructions of the first instruction set are X-bit instructions and instructions of the second instruction set are Y-bit instructions, where Y is different from X.*

*24. The method of claim 23 wherein X is 32 and Y is 16.*

*25. The method of claim 21 wherein the instruction set indicator portion of the sequence of bits comprises one or more least significant bits of the sequence of bits.*

*26. The method of claim 21 wherein the instruction set indicator portion of the sequence of bits comprises one or more most significant bits of the sequence of bits.*

*27. A data processing apparatus capable of operating using instructions from a predetermined plurality of instruction sets, the data processing apparatus comprising:*

*(i) a processor core responsive to a first instruction to access a sequence of bits, the sequence of bits having an address portion that specifies the location of a second instruction in a memory and an instruction set indicator portion, the processor core using the instruction set indicator portion of the sequence of bits to set one or more control flags; and*

*(ii) a controller responsive to the one or more control flags, the state of the one or more control flags specifying a current instruction set selected from the predetermined plurality of instruction sets, to cause the processor core to execute the second instruction as an instruction from the current instruction set,*

*wherein the one or more control flags are set without regard to the location of the second instruction.*

*28. The apparatus of claim 27 wherein the one or more control flags comprise one or more predetermined bits in a program counter.*

*29. The apparatus of claim 27, further comprising a memory system, wherein the memory system is not responsive to the one or more control flags.*

*30. The apparatus of claim 27, further comprising a memory system wherein the one or more control flags are not provided to the memory system.*

*31. The apparatus of claim 27 in which the predetermined plurality of instruction sets comprises a first instruction set and a second instruction set, and wherein instructions of the first instruction set are X-bit instructions and instructions of the second instruction set are Y-bit instructions, where Y is different from X.*

*32. The apparatus of claim 31 wherein X is 32 and Y is 16.*

*33. A data processing apparatus capable of operating using instructions from a predetermined plurality of instruction sets, the data processing apparatus comprising:*

*(i) a processor core responsive to a first instruction to access a sequence of bits, the sequence of bits having an address portion that specifies the location of a second instruction in a memory and an instruction set indicator portion and the instruction set indicator portion having at least one bit that is not part of the address portion of the sequence of bits;*

*(ii) the processor core using the instruction set indicator portion of the sequence of bits to set one or more control flags, the state of the one or more control flags specifying a current instruction set selected from the predetermined plurality of instruction sets; and*

*(iii) a controller responsive to the one or more control flags to cause the processor core to execute the second instruction as an instruction from the current instruction set.*

34. The apparatus of claim 33 wherein the one or more control flags comprise one or more predetermined bits in a program counter.

35. The apparatus of claim 33, further comprising a memory system, wherein the memory system is not responsive to the one or more control flags.

36. The apparatus of claim 33, further comprising a memory system wherein the one or more control flags are not provided to the memory system.

37. The apparatus of claim 33 in which the predetermined plurality of instruction sets comprises a first instruction set and a second instruction set, and wherein instructions of the first instruction set are X-bit instructions and instructions of the second instruction set are Y-bit instructions, where Y is different from X.

38. The apparatus of claim 37 wherein X is 32 and Y is 16.

39. A data processing architecture capable of operating using instructions from a predetermined plurality of instruction sets, the data processing architecture comprising:

(i) a processor core responsive to a first instruction to access a sequence of bits, the sequence of bits having an address portion that specifies the location of a second instruction in a memory and an instruction set indicator portion, the processor core using the instruction set indicator portion of the sequence of bits to set one or more control flags; and (ii) a controller responsive to the one or more control flags, the state of the one or more control flags specifying a current instruction set selected from the predetermined plurality of instruction sets, to cause the processor core to execute the second instruction as an instruction from the current instruction set, wherein the one or more control flags are set without regard to location of the second instruction.

40. The data processing architecture of claim 39 wherein the one or more control flags comprise one or more predetermined bits in a program counter.

41. The data processing architecture of claim 39, further comprising a memory system, wherein the memory system is not responsive to the one or more control flags.

42. The data processing architecture of claim 39, further comprising a memory system wherein the one or more control flags are not provided to the memory system.

43. The data processing architecture of claim 39 in which the predetermined plurality of instruction sets comprises a first instruction set and a second instruction set, and wherein instructions of the first instruction set are X-bit instructions and instructions of the second instruction set are Y-bit instructions, where Y is different from X.

44. The data processing architecture of claim 43 wherein X is 32 and Y is 16.

45. A data processing architecture capable of operating using instructions from a predetermined plurality of instruction sets, the data processing architecture comprising:

(i) a processor core responsive to a first instruction to access a sequence of bits, the sequence of bits having an address portion that specifies the location of a second instruction in a memory and an instruction set indicator portion and the instruction set indicator portion having at least one bit that is not part of the address portion of the sequence of bits;

(ii) the processor core using the instruction set indicator portion of the sequence of bits to set one or more control flags, the state of the one or more control flags specifying a current instruction set selected from the predetermined plurality of instruction sets; and (iii) a controller responsive to the one or more control flags to cause the processor core to execute the second instruction as an instruction from the current instruction set.

46. The data processing architecture of claim 45 wherein the one or more control flags comprise one or more predetermined bits in a program counter.

47. The data processing architecture of claim 45, further comprising a memory system, wherein the memory system is not responsive to the one or more control flags.

48. The data processing architecture of claim 45, further comprising a memory system wherein the one or more control flags are not provided to the memory system.

49. The data processing architecture of claim 45 in which the predetermined plurality of instruction sets comprises a first instruction set and a second instruction set, and wherein instructions of the first instruction set are X-bit instructions and instructions of the second instruction set are Y-bit instructions, where Y is different from X.

50. The data processing architecture of claim 49 wherein X is 32 and Y is 16.

51. A data processing apparatus capable of switching between a predetermined plurality of instruction sets, the data processing apparatus comprising:

(i) means for accessing a sequence of bits in response to a first instruction, the sequence of bits having an address portion that specifies the location of a second instruction in a memory and an instruction set indicator portion;

(ii) means for identifying an instruction set selected from the predetermined plurality of instruction sets based on the instruction set indicator portion of the sequence of bits in response to the first instruction;

(iii) means for setting one or more control flags to indicate that a current instruction set for the data processing apparatus is the instruction set identified based on the instruction set indicator portion of the sequence of bits in response to the first instruction; and (iv) means for retrieving the second instruction from the location specified by the address portion of the sequence of bits in response to the first instruction, wherein the instruction set identified by the instruction set portion of the sequence of bits is identifiable without regard to the location of the second instruction.

52. The data processing architecture of claim 51 wherein the one or more control flags comprise one or more predetermined bits in a program counter.

53. The data processing architecture of claim 51, further comprising a memory system, wherein the memory system is not responsive to the one or more control flags.

54. The data processing architecture of claim 51, further comprising a memory system wherein the one or more control flags are not provided to the memory system.

55. The data processing architecture of claim 51 in which the predetermined plurality of instruction sets comprises a first instruction set and a second instruction set, and wherein instructions of the first instruction set are X-bit instructions and instructions of the second instruction set are Y-bit instructions, where Y is different from X.

56. The apparatus of claim 55 wherein X is 32 and Y is 16.

57. A method of operating a data processing apparatus, the method comprising:

(i) receiving a first instruction from a first instruction set selected from a predetermined plurality of instruction sets;

(ii) translating the first instruction to generate a first set of one or more control signals;

(iii) accessing a sequence of bits comprising an address portion that specifies the location of a second instruction in a memory and an instruction set indicator portion in response to the first set of one or more control signals,

*the instruction set indicator portion having at least one bit that is not part of the address portion of the sequence of bits;*

(*iv*) *setting one or more control flags based upon the value of the instruction set indicator portion of the sequence of bits to specify that a current instruction set is a second instruction set selected from a predetermined plurality of instruction sets;*

(*v*) *retrieving the second instruction from the location specified by the address portion of the sequence of bits; and*

(*vi*) *translating the second instruction as an instruction from the current instruction set to generate a second set of one or more control signals.*

*58. The method of claim 57 wherein the predetermined plurality of instruction sets consists of two instruction sets.*

*59. The method of claim 58 wherein the first instruction set consists of X-bit instructions and the second instruction set consists of Y-bit instructions, Y being different from X.*

*60. The method of claim 59 wherein X is 32 and Y is 16.*

*61. The method of claim 59 wherein X is 16 and Y is 32.*

*62. The method of claim 57 wherein the first instruction set consists of X-bit instructions and the second instruction set consists of Y-bit instructions, Y being different from X.*

*63. The method of claim 62 wherein X is 32 and Y is 16.*

*64. The method of claim 62 wherein X is 16 and Y is 32.*

*65. A method of selecting an instruction set comprising the steps of:*

*receiving a branching instruction written in a first instruction set of a plurality of instruction sets;*

*in response to the branching instruction, inserting an address of a second instruction, which specifies the location of the second instruction in a memory, into a register and setting the value of a flag, where the value of the flag is not dependent upon the address of the location of the second instruction in the memory;*

*selecting an instruction set based upon the value of the flag; and*

*acquiring the second instruction.*

*66. The apparatus of claim 65, wherein:*

*the first instruction set is different from the second instruction set.*

*67. The apparatus of claim 65, wherein:*

*the pointer and the flag are located in a single register.*

*68. The apparatus of claim 65, wherein:*

*the pointer and the flag are not located in a single register, yet are written to as if portions of a single register.*

*69. A processing apparatus comprising:*

*a pointer for identifying an address, which specifies the location in a memory of a next instruction that is written in a first instruction set of a plurality of instruction sets; and*

*a flag for identifying the first instruction set;*

*wherein:*

*the pointer and the flag are both written in response to an instruction from a second instruction set of the plurality of instruction sets, and*

*the value of the flag is not dependent upon the address that specifies the location in the memory of the next instruction.*

* * * * *